Patented Aug. 22, 1944

2,356,128

UNITED STATES PATENT OFFICE 2,356,128

MIXED OLEFINIC POLYMERIZATION PROCESS AND PRODUCT

Robert M. Thomas, Union, and William J. Sparks, Cranford, N. J., assignors, by mesne assignments, to Jasco, Incorporated, a corporation of Louisiana No Drawing. Application October 20, 1939, Serial No. 300,336

36 Claims. (Cl. 260—79)

This invention relates to novel polymeric materials and to methods of manufacturing them and relates more particularly to the preparation of high molecular weight, tough elastic products by the copolymerization of olefinic and diolefinic hydrocarbons; to the compounding of such polymeric products with sulufur and sulfur compounds to develop an elastic limit and to increase the tensile strength, abrasion resistance and flexure resistance of the polymeric materials; and to the mixture of such polymers with various fillers, pigments, fabrics, etc.

Broadly the present invention consists in the process of reacting a low molecular weight olefin, preferably an isoolefin, such as isobutylene, with a low molecular weight diolefin, preferably a conjugated diolefin, such as butadiene or isoprene or dimethylbutadiene, etc., at relatively low temperature, namely, below 0° C. and preferably below —50° C., and even as low as —160° C. or lower in the presence of a suitable catalyst, such as aluminum chloride dissolved in a lower alkyl halide such as ethyl chloride or methyl chloride. Another feature of the invention occurs in the production of a polymer having a low, controlled, chemical unsaturation, capable of being cured with sulfur, and still another feature occurs in the polymer substance when combined with sulfur, sulfur compounds and analogous substances. The polymerization reaction is advantageously carried out in the presence of liquefied ethylene, ethane, methane, or other solvents for the reactants.

The material of the invention is a polymer or a copolymer or an interpolymer of the olefin and the diolefin. The catalytic reaction produced by the polymerization catalyst is an additive one in which the molecules of olefin and diolefin are coupled together to produce a very high molecular weight polymer and a low degree of chemical unsaturation, the amount of chemical unsaturation being a very small fraction of the unsaturation of the raw materials. This polymeric material shows the unexpected property of reacting with a substantial amount of sulfur or certain sulfur compounds to produce a cured material which may be completely saturated chemically by the sulfur, which material in its cured form, is neither tacky nor sticky, has no cold flow, has a high tensile strength ranging from 1500 pounds to 4500 pounds per square inch or higher, a very high extensibility ranging from 800% to 1100%, an elastic limit, a very great inertness to chemical reactions generally and a good resistance to solvents (except for a limited number). In addition, the cured material has an outstandingly high resistance to abrasion, flexure, and aging and is outstandingly resistant to the effects of destructive agents generally as well as to chemicals, such as acids, alkalies, solvents, hydrogen, oxygen, and ozone. In view of the low chemical unsaturation of the polymer as prepared, and the substantial absence of unsaturation in the cured material, these physical characteristics, so closely resembling those of rubber, are wholly unexpected.

In contrast, the polymeric substances of the present invention have iodine numbers below about 50 and generally ranging between 1 and 10, yet they are readily cured with sulfur. The polymeric materials of this invention are therefore unique in this respect in the combination therein of very low chemical unsaturation and the capability of being cured with sulfur.

This application is a continuation-in-part of our application Ser. No. 182,252, filed December 29, 1937.

The reaction of the present invention is a catalytic coupling of olefinic molecules to produce a very high molecular weight polymer substance which is obtained because of the new polymerization conditions presented by this invention. The new conditions of the invention are the combination of a low temperature with a very powerful catalytic solution which retains its catalytic activity at the low temperatures in the process of the present invention. The molecular weights of the new polymers vary from 15,000 to 250,000 or higher, and they contain a low but controlled amount of chemical unsaturation. These products are entirely different in character from previously produced olefinic polymers because of the fact that in spite of their relatively very low unsaturation, they are capable of interaction with sulfur and sulfur compounds under suitable conditions by which a cure is obtained to produce elastic materials having the properties of high tensile strength, high extensibility, definite elongation limit, and high resistance to abrasion, flexure, and chemical action; in addition, the materials have the capability of being mixed or "compounded" with a wide variety of substances to modify their physical characteristics.

The broad aspects of the practice of the invention include a series of steps, for the mixing of the reactants, which may take place in any one of several sequences. In a preferred sequence, the first step is the preparation of a mixture of an isoolefin such as isobutylene in the proportion of from approximately 70 to 99.5 parts with a diolefin such as butadiene or isoprene or dimethyl butadiene or pentadiene in the proportion of 30 to 0.5 parts. The mixture is then cooled to relatively very low temperatures, such as −50° C. and preferably to −70° C. or lower to −160° C., in the presence of a diluent-refrigerant such as liquid ethylene, or solid carbon dioxide and liquid propane, or liquid ethane, liquid methane, methyl chloride, or other diluent-refrigerant substances or mixtures. The new and very powerful catalyst in the form of aluminum chloride dissolved in a lower alkyl halide such as ethyl chloride or preferably methyl chloride, is then added to the chilled olefinic mixture in small proportion, and preferably in a condition of fine dispersion. The polymerization reaction then occurs rapidly at the low temperature, in the presence of the catalyst, to produce a white plastic solid polymer relatively insoluble in the reaction mixture which in appearance rather closely resembles a pure polyisobutylene. The sequence of the addition of isoolefin, diolefin and diluent may be varied at will, and the catalyst then added, or the isoolefin and diluent may be mixed, then the diolefin and catalyst mixed and added to the isoolefin-diluent mixture.

The requirements of the polymerized materials for the obtaining of a satisfactory cure with sulfur to yield a maximum tensile strength and maximum elasticity appear to be determined by the molecular weight in combination with the amount of unsaturation. The optimum amount of unsaturation appears to be that indicated by an iodine number in the material of 2 to 8. About the minimum useful amount of unsaturation is that corresponding to an iodine number of 1. The molecular weight must be above a minimum value of about 10,000 to 15,0000, in order to produce a material which can be cured to an elastic material with structural properties and this minimum molecular weight is required without regard to the amount of unsaturation in the molecule, although it varies to some extent with the amount of unsaturation. Polymeric materials of low enough molecular weight to have the consistency of oils or greases apparently may react with sulfur but do not give a tough, elastic material.

EXAMPLE 1

In carrying out the copolymerization, one suitable procedure is to mix the olefin and diolefin in the desired proportions, either alone or with a suitable solvent, diluent, or refrigerant, such as liquefied ethylene, at the desired low temperature ranging from −50° C. to −150° C., and then add the cooled catalyst, such as a 1% solution of aluminum chloride in ethyl chloride, either alone or dissolved in a suitable diluent, such as liquefied ethylene. The use of liquefied ethylene as a diluent has an additional advantage in that it serves simultaneously as an internal refrigerant to maintain the desired low temperature, the heat of the polymerization reaction being dissipated as latent heat of vaporization of the ethylene at its boiling point. Cooling of the reaction mixture may also be effected by either internal or external cooling coils through which a suitable refrigerating liquid is passed or by having the reacting liquids fed into a pipe, coil, or other conductor immersed in a suitable refrigerated bath. However, instead of using such a vaporizable diluent or solvent, powdered dry ice (solidified carbon dioxide) may be used as refrigerant merely by adding it to the reaction vessel. Owing to the desirability of maintaining a low temperature, it is preferred to have the catalyst, as well as the reactants, precooled to a temperature at least as low as the desired operating temperature. If dry ice is used as refrigerant, the operating temperature is about −78° C., whereas if liquefied ethylene is used as refrigerant an operating temperature of about −95° C. to −100° C. is maintained (ethylene alone boils at −103° C.). It is possible to use even lower temperatures by using liquefied methane or mixtures thereof with other hydrocarbons. Alkyl halides, such as methyl chloride may also be advantageously used as diluents, especially when dry ice is used as internal refrigerant or when cooling is carried out by external means.

In this example a preferred proportion for the polymerization mixture consists of from 70 to 90 parts of isobutylene, and from 30 to 10 parts of butadiene, diluted with from 100 to 400 parts of liquid ethylene. The catalyst solution as above pointed out desirably contains approximately 0.5% of aluminum chloride, and is preferably sprayed into the reaction mixture in the proportion of about 1 part of catalyst solution to 25 parts of reaction mixture.

The method of mixing the reacting materials is also of substantial importance in connection with the polymerization reaction. A preferred method is to place the liquid ethylene in the reaction container, a sufficient amount being added to bring the reaction container temperature to the desired low value of about −100° C. The desired amount of butadiene is then added to the liquefied ethylene, and then the desired amount of isobutylene is added. Thereafter the catalyst is added to the mixture, preferably in the form of a fine spray applied to the surface of the rapidly stirred mixture. It is desirable that points of local high concentration of catalyst be avoided, and that the most thorough possible dispersion and mixing of the catalyst with the polymerization mixture be obtained. The reaction proceeds with high speed, and may be complete within a few minutes.

For maximum tensile strength of the cured polymer substance, there is an optimum ratio of the butadiene to isobutylene of approximately 1 to 5 in the reaction mixture.

If desired, the reaction may be carried out under pressure, either just sufficiently above atmospheric to keep the reactant and solvent in the liquid phase or considerably higher pressures may be used, such as up to 10, 20, or 50 atmospheres or more.

Although it is obvious that the proportions of the various raw materials to be used may vary over fairly wide limits without departing from the scope of the invention, it is generally preferred to use less than 60% by weight and preferably even less than 30%, e. g., 10% or 20% or even as little as 1% or 0.5%, of the diolefins based on the total weight of olefin and diolefin.

The proportion of refrigerant-diluent, such as the liquid ethylene or the liquid ethane or the mixture of propane and solid carbon dioxide, is also a matter of importance in the preparation of all of these polymers. When liquid ethylene is used as a diluent-refrigerant, it is preferably present in the ratio of 100 parts to 500 parts per 100 parts of reactants and the optimum ratio of the liquid ethylene appears to be about 200 parts per 100 parts of reactants.

Instead of isobutylene, other isoolefins or tertiary base olefins capable of polymerizing in a manner similar to the isobutylene may be used, such as 2-methyl butene-1, 2-ethyl butene-1, etc. Generally it is desirable to use such isoolefins having not more than about 7 carbon atoms.

As the diolefin reactant, instead of using butadiene, other compounds, such as isoprene; cyclopentadiene; 2, 3-dimethyl butadiene-1,3; pentadiene-1, 3; hexadiene-2,4 and the like, may be used.

The effect upon the tensile strength and other characteristics of the polymer produced by variation in the amount of butadiene in proportion to the amount of isobutylene is shown in the subjoined Table A.

The preferred catalyst for the polymerization procedure of the present invention is a solution of aluminum chloride in lower alkyl halide. Such a solution of aluminum chloride in the alkyl halide is preferably prepared at a temperature below normal room temperature and then cooled to a temperature approximately that of the reactant substances in the reaction chamber. It may be prepared in saturated condition and even though the solubility of aluminum chloride in the alkyl halide at the polymerization temperature is very low, the aluminum chloride does not precipitate out during the chilling to the polymerization temperature. It is not known exactly why this occurs, but probably some type of super-saturated solution is produced. There does not ap-

Table A

*Isobutylene-butadiene polymer*

| Percent butadiene in total reactant mix | Carried to percent yield | Mol. wt. | Percent butadiene in polymer by iod. No. | Tensile strength, from curing times at 155° C. of— | | | Percent elongation, from curing times at 155° C. of— | | |
|---|---|---|---|---|---|---|---|---|---|
| | | | | 15 min. | 30 min. | 60 min. | 15 min. | 30 min. | 60 min. |
| 0 | 30.0 | 202,000 | 0 | 1,140 | 1,200 | 1,480 | 1,075 | 1,040 | 1,210 |
| 2.5 | 43.7 | 211,000 | | 1,940 | 2,000 | 1,970 | 1,220 | 1,250 | 1,255 |
| 5.0 | 37.1 | 189,500 | | 2,280 | 2,300 | 2,270 | 1,200 | 1,140 | 1,200 |
| 7.5 | 29.1 | 150,500 | | 2,300 | 2,700 | 2,460 | 1,220 | 1,160 | 1,160 |
| 10 | 51.0 | 143,000 | 0.4 | 2,390 | 2,540 | 2,960 | | | |
| 20 | 40.0 | 85,000 | 0.8 | 3,000 | 3,500 | 3,200 | | | |
| 30 | 27.3 | 55,000 | 1.03 | 3,000 | 2,750 | | | | |
| 40 | 5.3 | 24,500 | 1.49 | | 965 | 1,100 | | | |

In preparing this table eight experimental runs were made with varying percentages of butadiene in the polymerization mixture. The several successive runs 1, 2, 3, 4, 5, 6, 7, and 8, contained in the polymerization mixture as shown respectively 0, 2.5, 3.0, 5.0, 7.5, 10, 20, 30, and 40% of butadiene based on the total reactants. The following factors were kept constant:

Temperature _____ —103° C.
Diluent _____ 2 vols. ethylene/vol. reactant
Catalyst _____ AlCl₃ dissolved in CH₃Cl
Catalyst concentration ___ 0.5 g. AlCl₃/100 cc. CH₃Cl
Catalyst addition in the form of fine spray ____
_____ (125 cc./min.)

In preparing the polymer material for test it was compounded according to the following formula and cured at 155° C. for the indicated length of time.

| | Parts |
|---|---|
| Polymer | 100 |
| Sulfur | 3 |
| Zinc oxide | 5 |
| Stearic acid | 3 |
| Tuads (tetramethyl thiuram disulfide) | 1 |

In order to control the reaction time, and the percent yield, the polymerization reaction is conveniently halted at the desired stage by such procedures as suspending the addition of the catalyst or by adding to the mixture a substantial quantity of material which will destroy or quench the catalytic properties of the catalyst. The reaction is halted very quickly by the quenching procedure, but only slightly less quickly by suspension of the addition of catalyst. The quenching or destroying agent may be ordinary 95% ethyl alcohol or may be any of the other various alcohols, ethers, esters, ketones, and a wide variety of other substances. A preferred substance is "Ethyl Cellosolve," (ethylene glycol monoethyl ether) or ethylene glycol or analogous substances.

pear to be any complex formed between the alkyl halides and the aluminum chloride. The catalyst solution may be used in the condition in which it is prepared, that is substantially saturated at solution temperature, but this is not the preferred form, since the polymerization reaction when conducted with catalysts of such strength, tends to occur erratically and does not produce the optimum character of polymer. Instead it is preferable that it be diluted with additional quantities of the alkyl halide, ordinarily in amounts such as 2 to 4 or 5 volumes of additional solvent to the saturated solution of aluminum chloride in alkyl halide. Of the various alkyl halides available, methyl chloride and ethyl chloride are preferred. Methyl chloride solidifies at a temperature of —92° C., while ethyl chloride solidifies at a temperature of —128° C. Methyl chloride is preferred as solvent, especially in view of the greater ease of separation therefrom of any traces of hydrogen chloride and such like impurities which may be produced by interaction between the aluminum chloride and the alkyl halide or other side reactions. Furthermore, a superior quality of polymeric product is obtained by the use of aluminum chloride dissolved in methyl chloride, than is obtainable by catalyst dissolved in ethyl chloride, although the difference is small, and not readily evaluated.

EXAMPLE 2

Another preferred form of the invention consists in the step of adding the diluent-refrigerant, preferably liquid ethylene, to the reaction vessel, in the proportion of 100 to 300 parts, then mixing into the diluent-refrigerant the desired 95 parts to 99½ parts of the isobutylene, then adding to the mixture 5 parts to ½ part of isoprene, then adding the catalyst by the spraying method above described. The reaction proceeds rapidly to produce the desired polymer.

In this embodiment of the invention, the optimum ratio is about 99 parts of isobutylene and about one part of isoprene. This is found to give a polymer which cures well and yields a cured product of optimum physical strength which may run above 3,500 pounds per square inch. With more than 5 parts of isoprene, the material is of too low molecular weight to be commercially useful and if the 5 parts is considerably exceeded, the molecular weight may be so low that the material will not cure to an elastic product. Likewise, if less than about ½ part of isoprene is added, the material cures only with great difficulty.

The effect upon the characteristics of the polymer, especially after curing, of variation in the amount of isoprene in the reaction mixture is well shown by the following table in which experiment numbers 1, 2, 3, 4, 5, 6, 7, and 8 were conducted with the mixture of reactants containing respectively 0.5, 0.75, 1, 1.25, 1.50, and 2% of isoprene by volume, 3 experiments utilizing 1% being run to different percentage yields. In conducting these experiments the following uniform conditions were maintained:

Temperature _____ −103° C.
Diluent _____ 2 vols. ethylene/vol. of reactant
Catalyst__Aluminum chloride dissolved in CH₃Cl
Catalyst concentration _____ 0.5%
  (grams AlCl₃/CH₃Cl)
Catalyst addition in the form of
  fine spray _____ (125 cc./min.)

The reactor was an insulated, enameled reaction vessel fitted with an agitating mechanism. The liquid ethylene was first added in the cold, the chilled reactors were then added and thereafter the catalyst sprayed onto the surface of the liquid in the reaction period.

TABLE B

*Isoprene-isobutylene polymer*

| No. | Percent isoprene in total reactant mix | Percent yield | Percent isoprene in polymer | Mol. wt. | Tensile strength, from curing times at 155° C. of— | | | Percent elongation from curing times at 155° C. of— | | |
|---|---|---|---|---|---|---|---|---|---|---|
| | | | | | 15 min. | 30 min. | 60 min. | 15 min. | 30 min. | 60 min. |
| 1 | 0.5 | 52 | 0.63 | 64,000 | 1,590 | 1,860 | 2,410 | 1,200 | 1,080 | 1,080 |
| 2 | 0.75 | 34.2 | | 71,500 | 1,730 | 2,670 | 3,170 | 1,050 | 1,020 | 1,000 |
| 3 | 1.00 | 40.0 | 0.87 | 87,000 | 2,140 | 3,160 | 3,785 | | | |
| 4 | 1.00 | 45 | | 93,000 | 2,990 | 3,560 | 3,730 | 1,020 | 950 | 960 |
| 5 | 1.00 | 87 | | 68,000 | 2,250 | 3,220 | 3,680 | 1,000 | 950 | 970 |
| 6 | 1.25 | 40.8 | | 80,500 | 2,910 | 2,990 | 3,140 | 950 | 950 | 900 |
| 7 | 1.50 | 36.6 | 1.15 | 38,000 | 1,590 | 2,330 | 2,630 | 1,080 | 1,000 | 920 |
| 8 | 2.00 | 31.2 | 1.33 | 32,000 | 1,650 | 2,160 | 2,190 | 1,040 | 960 | 890 |

In preparing this material for test it was compounded according to the following formula:

Parts
Polymer _____ 100
Sulfur _____ 3
Zinc oxide _____ 5
Stearic acid _____ 3
Tuads _____ 1

The cures of all the experiments were made at 155° C.

It will be observed from this table that approximately 1% of isoprene of 99% isobutylene is the preferred concentration in the mixture of reactants.

This polymer is indistinguishable, as far as its physical properties are concerned, from the polymer of Example 1.

EXAMPLE 3

Another desirable embodiment of the invention consists in the steps of adding the diluent-refrigerant, preferably liquid ethylene, to the reaction vessel in the proportion of 100 to 300 parts, then mixing into the diluent-refrigerant a suitable proportion of isobutylene which may be from 95 to 99½ parts, then adding to the mixture 5 parts to ½ part of cyclopentadiene, then adding the catalyst as above pointed out. The catalyst in this instance is preferably the same solution of aluminum chloride, either in ethyl or methyl chloride.

The type of reaction of the mixture of isobutylene and cyclopentadiene is intermediate between that of the mixture containing butadiene and the mixture containing isoprene in that a portion only of the cyclopentadiene reacts into the polymer, but the change in concentration during polymerization is small. This is shown by the following table:

TABLE C

| Percent cyclopentadiene in total reactant mix | Percent yield | Percent cyclopentadiene in polymer | Mol. wt. | Tensile strength from curing time at 155° C. of— | | | Percent elongation from curing time at 155° C. of— | | |
|---|---|---|---|---|---|---|---|---|---|
| | | | | 15 min. | 30 min. | 60 min. | 15 min. | 30 min. | 60 min. |
| 0.5 | 52 | | 129,000 | 1,730 | 1,920 | 2,300 | 1,350 | 1,230 | |
| 1.0 | 37.1 | | 64,000 | 1,150 | 2,200 | 2,740 | 1,300 | 1,200 | 1,070 |
| 2.0 | 39.1 | 1.85 | | | 2,470 | | | | |
| 5.0 | 45 | 2.03 | | | 270 | | | | |

From this table it will be evident that for maximum tensile strength the preferred ratio of reactants is approximately 2% of cyclopentadiene and 98% of the isobutylene.

EXAMPLE 4

Another advantageous embodiment of the invention utilizes dimethyl butadiene as the diolefinic constituent. The reaction mixture may consist of 100 to 300 parts of diluent-refrigerant, preferably liquid ethylene, with 90 parts to 99½ parts of isobutylene and 10 parts to ½ part of the dimethyl butadiene. The catalyst is added as before to produce a similar polymerization reaction. The resulting polymer is also closely similar to the polymer produced by the preceding examples. It cures readily after compounding with small percentages of sulfur to yield a cured polymer of high tensile strength together with the other advantageous characteristics above pointed out.

The results of change in percentage of dimethyl butadiene in the reaction mixture show an optimum value of the same general type as with the other diolefins, and show the optimum value to occur at approximately 2% dimethyl butadiene in the polymerization mixture.

EXAMPLE 5

The above examples are given as generalizations of a series of experiments using ranges of reactants. As a specific example of the details of procedure and constituents, the following outline is presented:

An insulated 19-quart enamelled steel pail was cooled by means of solid carbon dioxide and 200 cc. of liquid butadiene, 800 cc. of liquid isobutylene, and 2,000 cc. of liquid methyl chloride were added. An excess of powdered solid carbon dioxide was then placed into the pail. The catalyst, which consisted of anhydrous aluminum chloride dissolved in liquid methyl chloride in a ratio of 5/10 g. of aluminum chloride per 100 cc. of methyl chloride, was precooled by means of an alcohol-solid carbon dioxide bath and then sprayed on the surface of the isobutylene-butadiene mixture, while maintaining vigorous stirring by hand. In a minute or so a voluminous white precipitate began to appear. Addition of the catalyst was continued until the operator estimated the reaction to be 30-40% complete, which amounted to a total time interval of about 4 minutes. The catalyst spray was stopped, and the reaction mixture quenched by the addition of 1 litre of 91% isopropyl alcohol which had been precooled to about −50° C.

The liquid was then decanted and the precipitate kneaded with hot water in a steam-heated, jacketed steel kneader for 10 minutes in order to remove adsorbed and absorbed solvents and catalysts. The product left the kneader in the form of snow-white balls, which were then placed on a mill and worked at about 115° C. to remove the water. The product was obtained as an odorless white, firm, elastic slab, which had a molecular weight of 42,000 and an unsaturation which indicated the presence of 0.77% of butadiene. The yield was 168 g., which is about 27% of the total weight of the isobutylene and butadiene employed.

The details of the procedure and advantages of the invention may be noted from the several examples which are given herein for the sake of illustration only and without intention to limit the invention thereto.

In the above examples a diluent is indicated as a portion of the reaction mixture. Such a diluent is, however, not necessary, since satisfactory results may be obtained by polymerizing the cooled mixture of isobutylene and the diolefin by the direct application to the mixture of the catalyst described in the form of a spray. In the absence of a diluent the obtainable yield is greatly reduced, and it is therefore desirable for maximum yields to have a diluent present.

The above examples of the method of practicing this invention utilize a catalyst which broadly is a solution of a Friedel-Crafts type catalyst in an alkyl halide, and the most efficient catalyst of this type for most purposes is a solution of aluminum chloride in methyl chloride.

In preparing the preferred type of catalyst, such as the solution of aluminum chloride in methyl chloride, it is desirable to dissolve the aluminum chloride in methyl chloride at a temperature of about −27° C. (its boiling point) because it is relatively insoluble at the operating temperatures, e. g., below −50° C. The same considerations apply to the preparation of a catalyst formed of ethyl chloride as solvent for the aluminum chloride, but higher temperatures may be used such as a temperature of +12° C. for the formation of the original solution. At this temperature the solubility is sufficiently high to prepare an adequate and suitable solution, even though the material is relatively insoluble at temperatures below −50° C.

In the preparation and use of the catalyst, it is found to be highly desirable that the catalyst solution be used as soon after preparation as is reasonably possible, and in any event within 24 to 48 hours after the preparation of the aluminum chloride solution in the alkyl halide especially at temperatures approximately room temperature. It is found that if the catalyst as prepared in solution is allowed to stand for any substantial length of time between the time of preparation and the time of use, the resulting polymer tends to have a considerably lower molecular weight than is obtainable from a freshly prepared catalyst.

These catalyst solutions as above described are, however, representative of a considerable group of catalysts made up of solutions in such substances as methyl chloride, ethyl chloride, carbon bisulfide and other low molecular weight solvents which are liquid and which do not form complexes with the Friedel-Crafts type metal halide catalyst dissolved in the liquid at the required reaction temperature. The metal halide catalyst may be one or more of various acid metal halides including aluminum halides such as aluminum chloride, aluminum bromide, etc., and various other active metal halides such as zirconium chloride, titanium tetrachloride, uranium chloride, etc.

Other compounds which may be used as solvents for the catalyst include methyl chloride, isopropyl chloride, chloroform, sulfuryl chloride, carbon disulfide and the like.

Thus the desirable catalysts for the polymerization reaction are the metal halide catalysts of the Friedel-Crafts type from the third and fourth groups of the periodic table. Boron trifluoride also is an advantageous catalyst for this reaction, but is a non-metal; and uranium tetrachloride likewise is an advantageous metal halide Friedel-Crafts type catalyst but is from the sixth group of the periodic table.

This grouping of catalyst substances is well shown by the discussion of "The Friedel-Crafts Synthesis" by N. O. Calloway in the issue of "Chemical Reviews" published for the American Chemical Society at Baltimore in 1935, being volume 17, No. 3, the article beginning on page 327, the list being particularly well shown on page 375.

It may be noted that the character of the polymeric material obtained by the various catalysts varies somewhat with the particular catalyst. The preferred catalyst, as herein described, consisting of aluminum chloride dissolved in ethyl or methyl chloride, produces a polymeric material having a molecular weight of from 15,000 to 200,000 or more, which, when compounded with sulfur and heated for a curing operation, yields a material having the desired high elongation of 500% to 1100%, high tensile strength ranging from 1,000 to 4,500 lbs. per square inch, or above, and a high abrasion and flexure resistance. The nearest comparable catalysts are zirconium chloride and boron trifluoride in alkyl halide solutions. These catalysts are soluble in alkyl halides at low temperatures and give polymeric products having similar characteristics of high strength, high elasticity, and high abrasion and flexure resistance, although the specific values tend to be slightly different from those of a poylmer produced by aluminum chloride-methyl chloride as catalyst.

The effect of variation in temperature of polymerization upon the tensile strength of the resulting polymer is well shown in the subjoined Table D.

TABLE D

Reaction mix. 80 parts isobutylene–20 parts butadiene

| Polymerization temperature | Molecular weight | Percent unsaturation | Tensile strength |
|---|---|---|---|
| | | | $Lbs./in.^2$ |
| −44.5° C | 12,000 | 1.77 | 0 |
| −78° C | 42,000 | 0.77 | 1,850 |
| −103° C | 86,500 | 0.88 | 3,500 |

Reaction mix. 99 parts isobutylene–1 part isoprene

| Polymerization temperature | Molecular weight | Percent unsaturation | Tensile strength |
|---|---|---|---|
| | | | $Lbs./in.^2$ |
| −44.5° C | 20,500 | 0.77 | 0 |
| −78° C | 53,500 | 0.69 | 3,100 |
| −103° C | 86,500 | 1.14 | 3,700 |

Reaction mix. 98.5 parts of isobutylene–1½ parts dimethyl butadiene

| Polymerization temperature | Molecular weight | Percent unsaturation | Tensile strength |
|---|---|---|---|
| | | | $Lbs./in.^2$ |
| −44.5° C | 17,500 | 1.07 | 0 |
| −78° C | 63,000 | 0.80 | 3,500 |
| −103° C | 122,000 | 1.12 | 4,100 |

It will be observed from these tables that with these reaction mixtures, the tensile strength obtainable by curing the resulting polymer increases as the temperature decreases.

If desired, the texture of these various polymer products may be substantially modified by mixing therewith before, during, or after co-polymerization a substantial amount of mineral fillers, pigments, etc., such as pulverized clays, limestone dust, pulverized silica, diatomaceous earth, iron oxide, sulfur, carbon black, accelerators, etc. These materials may be used either in small amounts, such as 1/10% to 1% or 5% or so, or in sufficiently large amounts, e. g., 5% to 20% or 30% or 60% or more, to effect a major change in the "body" of the copolymer. Also, it may be desirable to incorporate a substantial amount of a plasticizer or softener, such as paraffin wax, petrolatum, viscous mineral lubricating oil or a small amount of a relatively non-volatile organic compound, such as dibutyl phthalate, with the copolymer. Also, other substances may be added, such as dyes, anti-oxidants, etc. These various materials may be either mixed in during the course of the polymerization or may be mixed in by milling into the polymerized product, either at ordinary or somewhat elevated temperatures and either alone or in the presence of suitable solvent or softening agent.

In the curing of the polymeric material according to the present invention, it is possible to compound the polymeric material with sulfur alone, and by a prolonged heating at a substantially elevated temperature, a cure can be obtained. Usually, however, this cure is not complete, and is suitable for only a limited number of purposes. It has been found that with sulfur alone, the rate of reaction between the sulfur and the copolymer is very slow, and that at the temperature required, depolymerization and breakdown of the polymer occurs at such a speed that considerable injury to the polymer is caused before a maximum cure is attained. Because of these facts, it is highly desirable to incorporate into the polymer a suitable quantity of suitable cure aids and accelerators, including such substances as zinc oxide, stearic acid and the various sulfur compounds of thiuram and dithiocarbamate type together with an appropriate amount of sulfur.

EXAMPLE 6

An appropriate compounding formula is as follows:

| | Parts |
|---|---|
| Polymer material | 100 |
| Sulfur | 3 |
| Zinc oxide | 5 |
| Stearic acid | 3 |
| Tuads (tetramethyl thiuram disulfide) | 1 |

In preparing this compound, it is desirable that the polymer as obtained from the reaction chamber be washed in a Werner and Pfleiderer type kneader with hot water, or a hot alkaline liquid such as dilute alkali solution or calcium hydroxide suspension followed by a water wash. The material is then very thoroughly dried, and subjected to a severe mixing treatment in a Banbury type mill at a temperature between 125° C. and 175° C. This drastic milling treatment homogenizes the polymer and removes the foci of impurities which otherwise tend to cause flaws, bubbles and weak spots in the finished material. The several compounding ingredients including the sulfur, the stearic acid and the zinc oxide are added during the working in the Banbury mill.

The Banbury treated material is then desirably worked on the open roll mill until it is warmed up, although no breakdown occurs on the open mill which is in any way analogous to the breakdown of rubber on the roll mill. The mixture is worked on the mill until a thorough incorporation of the various ingredients is obtained. The Tuads (tetramethyl thiuram disulfide) is desirably added at practically the close of the mixing operation, preferably after the rolls and the mix have been cooled to a considerable extent since otherwise a premature cure may occur on the rolls.

The compound above suggested produces what may be called a pure gum stock since it contains only a minimum of added material. Alternatively, a wide range of auxiliary substances such as inert pigments, organic fillers, clay, carbon black, and other substances may be added to modify the characteristics of the material.

The compounded polymer is then cured, preferably in molds, by the application of a temperature ranging from 125° C. to 175° C. or higher up to 200° C. for a time interval ranging from 5 minutes to 120 minutes or more, according to the curing temperature, character of sulfur compound etc.

For some purposes the curing is preferably carried out at a relatively low temperature, e. g., between about 100° C. and 150° C., preferably about 120° C. or 130° C., or at a temperature at which a relatively long time, e. g., 4 or 5 hours or more, is required to effect the curing. In other words, for some purposes, it is better to use a low temperature, long time curing than to use a high temperature, short time curing.

The curing time and curing temperature are markedly affected by the amount of sulfur aid or accelerator. The following table shows the effect of time and temperature upon the tensile strength of a high grade polymer containing approximately 3% of sulfur, and approximately 1% of Tuads (tetramethyl thiuram disulfide).

TABLE E

Effect of temperature upon the cure of polymer

| Cure time | 133° C. cure | | 145° C. cure | | 150° C. cure | | 155° C. cure | |
|---|---|---|---|---|---|---|---|---|
| | Tensile, lbs.per sq.in. | Elong. | Tensile | Elong. | Tensile | Elong. | Tensile | Elong. |
| 15' | Undercured | | 1,300 | 1,270 | 2,400 | 1,130 | 2,780 | 1,130 |
| 30' | 1,400 | 1,260 | 1,970 | 1,080 | 3,350 | 1,090 | 3,540 | 1,090 |
| 60' | 2,720 | 1,180 | 2,640 | 1,000 | 3,360 | 970 | 3,510 | 970 |
| 120' | 2,930 | 1,030 | 3,360 | 980 | 3,620 | 980 | 3,640 | 980 |

It will be evident from this table that there is a definite relationship between the time of curing and the temperature of curing and that a satisfactory cure can be obtained from a short time of cure at relatively high temperature or a long time of cure at a somewhat lower temperature.

The characteristics of the cured material are presented in the following table:

TABLE F

Isobutylene-butadiene polymer (Example I)

| Exp. No. | Per cent butadiene in total reaction mix | Mol. wt. | Tensile strength, from curing time of— | | | Per cent elongation, from curing time of— | | |
|---|---|---|---|---|---|---|---|---|
| | | | 15 min.[1] | 30 min. | 60 min. | 15 min. | 30 min. | 60 min. |
| 1 | 2.5 | 211,000 | 1,940 | 2,000 | 1,970 | 1,220 | 1,250 | 1,255 |
| 2 | 5.0 | 189,500 | 2,280 | 2,300 | 2,270 | 1,200 | 1,140 | 1,200 |
| 3 | 10 | 129,000 | 2,135 | 2,410 | 2,400 | | | |
| 4 | 10 | 143,000 | 2,390 | 2,540 | 2,960 | | | |
| 4A | 20 | 85,000 | 3,000 | 3,500 | 3,200 | | | |

[1] The time indicated refers to the time of cure at 155° C.

Isobutylene-isoprene polymer (Example II)

| Exp. No. | Per cent isoprene in total reaction mix | Mol. wt. | Tensile strength, from curing time of— | | | Per cent elongation, from curing time of— | | |
|---|---|---|---|---|---|---|---|---|
| | | | 15 min. | 30 min. | 60 min. | 15 min. | 30 min. | 60 min. |
| 6A | 0.5 | 64,000 | 1,590 | 1,860 | 2,410 | 1,200 | 1,080 | 1,080 |
| 6B | 0.8 | 95,000 | 3,420 | 3,580 | 3,420 | 930 | 860 | 840 |
| 7 | 1.0 | 87,000 | 2,140 | 3,160 | 3,785 | | | |
| 7A | 1.0 | 93,000 | 2,990 | 3,560 | 3,730 | 1,020 | 950 | 960 |

Isobutylene-cyclopentadiene polymer (Example III)

| Exp. No. | Per cent cyclopentadiene in total reaction mix | Mol. wt. | Tensile strength, from curing time of— | | | Per cent elongation, from curing time of— | | |
|---|---|---|---|---|---|---|---|---|
| | | | 15 min. | 30 min. | 60 min. | 15 min. | 30 min. | 60 min. |
| 8A | 0.5 | 129,000 | 1,730 | 1,920 | 2,300 | 1,350 | 1,230 | |
| 5 | 1.0 | 64,000 | 1,150 | 2,200 | 2,740 | 1,300 | 1,200 | 1,070 |
| 6 | 2.0 | | | | 2,470 | | | |

Isobutylene-dimethylbutadiene polymer (Example IV)

| Exp. No. | Per cent dimethyl butadiene in total reaction mix | Mol. wt. | Tensile strength, from curing time of— | | | Per cent elongation, from curing time of— | | |
|---|---|---|---|---|---|---|---|---|
| | | | 15 min. | 30 min. | 60 min. | 15 min. | 30 min. | 60 min. |
| 8 | 0.5 | 121,000 | 1,950 | 2,220 | 2,380 | 1,160 | 1,060 | 1,030 |
| 9 | 1.0 | 113,000 | 2,600 | 3,110 | 3,570 | 1,050 | 960 | 950 |
| 10 | 1.25 | 138,000 | 3,260 | 3,500 | 4,000 | 960 | 920 | 870 |
| 11 | 1.5 | 127,000 | 3,290 | 4,000 | 4,180 | 1,030 | 950 | 880 |
| 12 | 1.5 | 145,000 | 3,800 | 3,850 | 4,050 | 960 | 930 | 840 |
| 13 | 2.0 | 100,000 | 3,180 | 3,840 | 3,880 | 960 | 910 | 850 |

It will be noted that the products of Examples I to IV, inclusive, when cured after compounding as above described of the type above indicated, yield a highly valuable material. The basic compounding formula above presented indicates the use of a sulfurization aid or accelerator in the form of Tuads (tetra methyl thiuram disulfide).

Tuads is one of the commonly used accelerators for rubber, but the action of this substance in conjunction with sulfur and the polymeric material made as above described appears to be greatly different from the interaction of sulfur and the accelerator with rubber, and this difference is manifested by the fact that there is no necessary relationship between the response of rubber to sulfur and an accelerator substance, and the response of the polymer and sulfur to the same substance. This is shown by the following table in which the interaction of a considerable number of the commonly used rubber accelerators with the polymeric material and sulfur is shown.

TABLE G

| Accelerator | Percent | Tensile strength for various cures at 155° C. | | | |
|---|---|---|---|---|---|
| | | 15 min. | 30 min. | 60 min. | 120 min. |
| Captax (a) | 0.5 | No cure | No cure | No cure | No cure. |
| Zenite (b) | 0.5 | ----do---- | ----do---- | ----do---- | Do. |
| Captax | 1.0 | ----do---- | ----do---- | ----do---- | Do. |
| Zenite | 1.0 | ----do---- | ----do---- | ----do---- | Do. |
| Captax | 3.0 | ----do---- | ----do---- | V. sl. cure | Sl. cure. |
| Zenite | 3.0 | ----do---- | ----do---- | No cure | V. sl. cure. |
| Tuads (c) | 0.5 | | 1,880 | 2,760 | 2,745. |
| Selenac (d) | 0.5 | | 1,110 | 2,050 | 2,510. |
| Tuads | 1.0 | 2,360 | 2,800 | 3,130 | 2,765. |
| Selenac | 1.0 | 1,590 | 2,225 | 2,415 | 2,965. |
| Tuads | 3.0 | 2,100 | 2,455 | 2,700 | 2,500. |
| Selenac | 3.0 | 2,740 | 2,990 | 2,760 | 1,715. |
| Thionex (e) | 0.5 | Undercure | 2,025 | 2,900 | 2,810. |
| Zimate (f) | 0.5 | ----do---- | 2,315 | 2,660 | 2,935. |
| Butyl zimate (g) | 0.5 | ----do---- | Undercure | 1,860 | 2,410. |
| Tetrone A (h) | 0.5 | ----do---- | ----do---- | 1,800 | 2,225. |
| Thionex | 1.0 | 2,735 | 2,615 | 2,840 | 2,540. |
| Zimate | 1.0 | Undercure | 1,965 | 2,675 | 3,140. |
| Butyl Zimate | 1.0 | ----do---- | 1,350 | 2,480 | 2,630. |
| Tetrone A | 1.0 | ----do---- | 1,740 | 2,480 | 2,595. |

(a) Mercaptobenzothiazole.
(b) Zinc salt of Captax.
(c) Tetramethyl thiuram disulfide.
(d) Selenium tetraethyl dithiocarbamate.
(e) Tetramethyl thiuram monosulfide.
(f) Zinc dimethyl dithiocarbamate.
(g) Zinc dibutyl dithiocarbamate.
(h) Dipentamethylene thiuram tetrasulfide.

Those compounds which we have found most effective for promoting the reaction of our copolymeric materials with sulfur are the dithiocarbamates and the thiuram sulfides. In case of the former, we prefer to use dialkyl dithiocarbamates, but any compounds of the general formula:

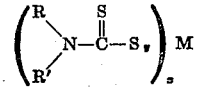

where R and R' are any organic radicals, Y and X are integers, and M is a metal radical, may be used. In case of the thiuram sulfides, we prefer to use tetramethyl thiuram disulfide, but any compounds of the following general formula are applicable:

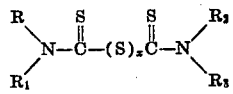

R, R', $R_2$ and $R_3$ are any organic radicals, alike or unlike, and X is any integer. However, we prefer R, R', $R_2$ and $R_3$ to be low molecular weight alkyl groups and X to be 2. Other modifications of these classes of compounds are apparent to those skilled in the art, and all those substances which have either of these type formulas as a part of their constitution are especially applicable as accelerators for our curing process.

EXAMPLE 7

75 parts by weight of the polymer produced as described in Example 1 and shown in Table A, line 6, were milled together in a rubber mill with 5 parts of magnesium oxide, 2 parts of sulfur and one part of hexamethylene tetramine and the compound produced was heated for 2 or 3 hours in a press at 160° C. to 180° C. and then removed to an oven at 110° C. for 48 hours. The resulting product was generally changed in character but was not fully cured, as it had a low tensile strength and high permanent set. Another sample of this compounded copolymer product was treated for 15 minutes with sulfur monochloride ($S_2Cl_2$) at room temperature and then removed to an oven at 120° C. for 20 minutes and also found to be very tough, had a definite limit of elasticity and was fully cured. These results show that the polymer from a 20% butadiene, 80% isobutylene reactant mix, can be cured although requiring more drastic curing conditions than rubber or polymerized butadiene. If desired, the polymer may be broken down some by milling prior to compounding with the filler and sulfur compound accelerator, etc.

EXAMPLE 8

A polymer of the type used in Example 6 produced from an isoolefin-diolefin mixture containing 20% of butadiene was compounded as follows:

| | Parts |
|---|---|
| Polymer | 100 |
| Zinc oxide | 10 |
| Sulfur | 3 |
| Stearic acid | 3 |
| Zimate | 1 |
| Carbon black | 25 |
| Total | 142 |

This composition was cured for 5 hours at 130° C. After curing, the product showed a tensile strength (Scott) of 1560# with an elongation of 1100%. It had good elasticity and fair retractability. The cured sheet was found to be very resistant to benzene and ethylene dichloride. It was also much more resistant to acids, such as sulfuric acid or nitric acid than soft vulcanized rubber.

The cured polymeric material of the present invention shows an outstandingly greater resistance to solvents and chemicals generally than can be obtained from rubber. This difference is shown by the following table. In preparing this table, weighed samples of vulcanized rubber, and weighed samples of cured polymeric material, were placed in the reagents indicated. Each sample both of rubber and of the polymeric material contained 40 parts of carbon black per 100 parts of gum.

TABLE H

| Solvent | Rubber | | Copolymer | |
|---|---|---|---|---|
| | Percent wt. inc. | Tear resistance | Percent wt. inc. | Tear resistance |
| Amyl acetate | 160 | Very poor | 35 | Good. |
| Ethyl acetate | 80 | Poor | 29 | Do. |
| Nujol | 52 | Good | 31 | Do. |
| Conc. $H_2SO_4$ | | Deteriorated | | Not affected. |
| Conc. $HNO_3$ | | Dissolved | | Do. |
| Conc. HCl | | Hard and inelastic | | Do. |
| Oleic acid | 110 | Fair | 31 | Good. |
| Carbon tetrachloride | 575 | Poor | 590 | Poor. |
| Ethylene dichloride | 203 | do | 38 | Good. |
| Chlor-benzene | 360 | Very poor | 280 | Very poor. |
| Trichlor ethane | 630 | do | 530 | Do. |
| Diethyl ether | 140 | Poor | 63 | Good. |
| Carbon disulfide | 445 | Very poor | 380 | Very poor. |
| Benzene | 225 | do | 94 | Poor. |
| Nitro-benzene | 105 | Good | | Good. |

The above results are those which occurred, after a time of immersion of the samples in the respective reagents of approximately 7 days. They indicate clearly that the cured copolymer has a very much higher resistance than rubber to oxygenated solvents such as amyl acetate and diethyl ether. The cured copolymer is also much more resistant to ethylene dichloride although in other chlorinated solvents, such as carbon tetrachloride or chlorobenzene, there is much less difference in resistance. The table also shows that the ordinary mineral acids do not affect the cured copolymer, whereas rubber is strongly affected or disintegrated after a relatively short immersion in nitric, sulfuric, or hydrochloric acid.

Comparative values of the acid resistance are shown by quantitative measurements as set forth below on the effect of concentrated sulfuric acid on the tensile strength of the copolymer substance of the invention produced by the polymerization of mixtures of isobutylene with dimethyl butadiene. These results corroborate visual inspection of qualitative tests and show that even upon prolonged treatment in concentrated sulfuric acid at room temperature, no deleterious action is produced by the acid on the polymeric substance. The numerical results show the time and temperature of cure, the tensile strength of the material immediately after curing, the tensile strength after submergence in concentrated sulfuric acid at room temperature for seven days, and the comparative values of the tensile strength after two weeks treatment in an oxygen bomb at room temperature and 300 pounds per square inch pressure.

| Cure | Orig. tensile strength | Tensile strength after 1 week acid contact at 80–85° F. | Tensile strength after 2 weeks in oxygen bomb at 70° C. and 300#/sq. in. oxygen pressure |
|---|---|---|---|
| 15 min. x 141° C | 900 | 1,140 | 1,650 |
| 30 min. x 141° C | 2,580 | 2,365 | 2,390 |
| 60 min. x 141° C | 2,880 | 3,040 | 2,310 |
| 120 min. x 141° C | 3,300 | ¹2,055 | 3,050 |
| 15 min. x 147° C | 2,180 | 1,480 | 1,730 |
| 30 min. x 147° C | 2,970 | 2,520 | 2,350 |
| 60 min. x 147° C | 2,970 | 1,950 | 2,570 |
| 120 min. x 147° C | 3,460 | 2,460 | 3,360 |
| 15 min. x 155° C | 3,000 | 2,410 | 2,400 |
| 30 min. x 155° C | 3,240 | 3,050 | 3,280 |
| 60 min. x 155° C | 3,380 | 2,960 | 3,420 |
| 15 min. x 160° C | 3,100 | 2,600 | 2,950 |
| 30 min. x 160° C | 3,500 | 3,520 | 3,450 |
| 60 min. x 160° C | 3,520 | 3,160 | 3,260 |
| 120 min. x 160° C | 3,500 | 3,240 | 3,100 |

¹ Poor sample.

These tests were made upon a cured compound of a type which may be called "pure gum stock" compounded according to the following formula:

Copolymer _____ 100
ZnO _____ 5
Stearic acid _____ 3
Sulfur _____ 2
Tuads (tetra methyl thiuram disulfide) ____ 1

The presence of copper, manganese and cobalt salts, singly or in combination, exerts a very deleterious influence on vulcanized rubber which is probably caused by accelerated oxidation, and the injury occurs even when the percentages of copper, manganese, or cobalt are very low, for instance, 0.01% or less. (It is because of the fact that copper causes such marked deterioration of rubber compositions that copper conductors generally are coated with tin or wrapped with cotton when a rubber insulation is to be used on them, for the purpose of separating the rubber from direct contact with the copper. To the present, it has been impossible to find any interaction between the cured polymer and copper, manganese and cobalt salts, and these metals or their salts appear to be wholly without deleterious effect upon the cured copolymer. This is indicated by the following table which shows the effect of various metal salts when added with the necessary curing ingredients to the polymeric material, which was then cured, tensile strength readings taken, the samples aged in a Geer oven or in a Bierer bomb, and retested.

TABLE K

| Sample number and percent metal salt added | Type aging | Tensile strength | | Elongation | |
|---|---|---|---|---|---|
| | | Before | After | Before | After |
| #461 (blank) | 1 week Geer oven (95° C.) | 2,110 | 1,880 | 1,000 | 1,000 |
| #470–A 1% copper oleate | do | 2,070 | 2,380 | 1,000 | 1,000 |
| #473–0.5% manganese tertiary amyl phenol sulfide | do | 2,250 | 2,000 | 950 | 1,020 |
| #473–0.5% manganese tertiary amyl phenol sulfide | 92 hrs. Bierer bomb 70° C | 2,250 | 2,140 | 1,050 | 1,070 |

For purposes of comparison, 0.5% of manganese tertiary amyl phenol sulfide and 0.5% copper oleate were milled into rubber. After 14 hours aging in the Geer oven at 95° C. the tensile strength was so low it could not be determined. In another experiment 1% of cobalt tertiary amyl phenol sulfide was added to a rubber composition and the vulcanizate aged in a Bierer bomb for 72 hours. At the end of this aging period the rubber sample had melted and fallen to the bottom of the bomb.

Thus, the cured polymeric material of the present invention is markedly superior in its chemical resistance to rubber, and also markedly superior to all of the rubber substitutes in its resistance to chemical reagents generally.

Not only is the cured polymer of the present invention outstandingly resistant to chemical reactions generally, but it is also highly resistant to the effects of sunlight. To determine the comparative resistivities of the cured polymer of the invention in comparison to rubber and synthetic or substitute rubbers generally, a series of samples of the cured copolymer material, and several rubber tread stocks were stretched 100%, fastened in that position and exposed to direct sunlight for a period of eight days. At the end of the exposure, the rubber specimens were cracked; the polymer retained its original appearance. After forty-two days of exposure to sunlight all of the rubber specimens were badly cracked. All but one polymer sample showed a very slight roughness. The one polymer sample was compounded with 1% of a technical, age-resisting material known as "Sunproof" which is largely a mixture of various waxes. These tests indicate that the sunlight resistance of the polymer material of the invention is outstandingly superior to that of rubber, to the extent of being of a wholly different order of magnitude, and it is equal to or superior to the sunlight resistance of the best of the rubbers.

The above-presented formulae contain various auxiliary substances which are desirable in small proportions. These particularly are small proportions of stearic acid and zinc oxide. These substances substantially improve the physical characteristics of the cured polymer, but their method of operation is still unknown. Carbon black is also a desirable constituent of the cured polymeric material. It is found that the addition of carbon black very materially raises the abrasion resistance, and is relatively harmless to the tensile strength and elongation of the material. Also much larger proportions may be included in the cured polymer than is possible to be included in vulcanized rubber.

The polymeric material of the present invention is powerfully resistant to aging effects, and the rate of deterioration with the passage of time is very much less than with any other known substance having rubber-like physical characteristics. That is, the material will retain its desirable physical properties for a very much greater length of time under given degrading influences than is possible with any other known rubbery substance. A standard test for the age-resisting properties of elastic substances is the Bierer-Davis bomb, the test being performed by measuring the tensile strength of a sample of compound, then aging it in a bomb filled with oxygen at elevated pressure, for a substantial period of time, and then retesting the tensile strength; or by measuring both the tensile strength and elongation before and after aging. The polymeric material was compounded according to the following formula:

Polymer
Zinc oxide
Sulfur
Stearic acid
Tuads (tetra methyl thiuram disulfide)
Carbon black This compound was cured and samples tested. Thereafter samples were aged for fourteen days in the Bierer-Davis bomb and retested as shown in the table.

TABLE M

| Sample | Per cent black pigment | Age resister | Lbs./sq. in. tensile | | | Per cent elogation | | |
|---|---|---|---|---|---|---|---|---|
| | | | Orig. | After aging | Per cent loss | Orig. | After aging | Per cent loss |
| Polymer | 80 | None | 2,125 | 1,525 | 29.2 | 700 | 600 | 14.3 |
| Do | 75 | do | 2,300 | 1,520 | 33.9 | 725 | 600 | 17.2 |
| Do | 75 | do | 2,120 | 1,780 | 16.0 | 700 | 600 | 14.3 |
| Do | 75 | do | 2,150 | 1,700 | 20.9 | 750 | 640 | 14.7 |
| Do | 75 | do | 2,250 | 1,650 | 26.6 | 750 | 630 | 16.0 |
| Do | 75 | do | 2,050 | 1,400 | 31.6 | 730 | 600 | 17.8 |
| Do | 75 | 0.2% Agerite Resin D | 2,000 | 1,500 | 25.0 | 720 | 630 | 12.5 |
| Do | 75 | do | 2,025 | 1,500 | 26.0 | 720 | 650 | 9.8 |
| Do | 75 | 0.5% Zn TAPS | 2,100 | 1,500 | 28.6 | 720 | 650 | 9.8 |
| Do | 75 | 0.5% Mg TAPS | 2,000 | 1,575 | 21.2 | 700 | 650 | 7.2 |

This shows that the age resistance of the material is excellent.

Similarly, the abrasion resistance is substantially unchanged by aging in the Bierer-Davis bomb. A series of samples were checked for abrasion resistance as shown by the subjoined Table N. These were samples substantially the same as those tested for age resistance as above described.

TABLE N

| Sample | Abrasion, cc. loss/HP hr. | |
|---|---|---|
| | Orig. | After aging 14 days |
| Polymer | 77 | 87 |
| Do | 115 | 99 |
| Do | 135 | 96 |
| Do | 134 | 121 |
| Do | 126 | 105 |
| Do | 107 | 144 |
| Do | 122 | 131 |
| Do | 113 | 131 |
| Do | 111 | 130 |
| Do | 210 | 355 |

Similarly, the flexure resistance of the copolymer is substantially unchanged by the aging procedure. This is well shown by the results in the subjoined Table O. In preparing this table, samples of the same polymer compound were used as were used for the other aging tests. The test was conducted on a De Mattia flexure tester, which consists of a motor-driven mechanism having parallel jaws which were moved to and from each other. The specimens in the form of sheets were clamped without stretching between the jaws at the maximum jaw opening, and the jaws were then oscillated to and from each other with the result that the material bows in the middle during the approaching movement and is drawn out to a substantially flat condition but without stretching during the receding movement of the jaws.

Table O shows the flex resistance before and after aging. The degree of flex resistance is indicated by the number of flexures before cracking occurs, the original condition being indicated in the table by the letters "OK"; and the degree and rate of cracking is indicated by the numbers 1 to 10; 1 being a very slight cracking and 10 being a very complete failure by breaking entirely.

TABLE O

| No. flexures | Rubber | | Polymer | | Polymer | | Polymer | | Polymer | | Polymer | |
|---|---|---|---|---|---|---|---|---|---|---|---|---|
| | Orig. | Aged | Orig. | Aged | Orig. | Aged | Orig. | Aged | Orig. | Aged | Orig. | Aged |
| 140,000 | 1 | 3 | OK | OK | OK | OK | OK | OK | OK | OK | OK | OK |
| 200,000 | 1 | 6 | OK | OK | OK | OK | OK | OK | OK | OK | OK | OK |
| 400,000 | 4 | 9 | OK | OK | OK | OK | OK | OK | OK | OK | OK | OK |
| 500,000 | 5 | 10 | OK | OK | OK | OK | OK | OK | OK | OK | OK | OK |
| 800,000 | 9 | | OK | OK | OK | OK | OK | OK | OK | OK | OK | OK |
| 1,000,000 | 10 | | 1 | OK | 1 | OK | 1 | OK | 1 | OK | OK | OK |
| 1,400,000 | | | 7 | 1 | 3 | OK | 1 | OK | 1 | OK | OK | OK |
| 2,000,000 | | | 9 | 4 | 8 | 2 | 1 | OK | 1 | OK | OK | OK |
| 3,000,000 | | | 9 | 9 | 9 | 8 | | 1 | | 2 | OK | 1 |

The polymeric material is well adapted to loading with a wide variety of pigments. For instance, fine particle size whiting and fine particle titanium dioxide may be used as fillers in such large percentages as 100% and even over 200% of the weight of the polymer substance without seriously affecting the quality and appearance of the cured polymer material. They produce low modulus stocks of good tensile strength. Clay of the type known as "Dixie clay" may be used to advantage in proportions up to about 50% on the polymer substance itself to produce high modulus, medium tensile strength stocks.

Zinc oxide likewise may be used as a loading pigment as well as an aid to the curing and the results are much the same as with titanium dioxide. With these substances and with the fine particle whiting in addition, the polymeric material shows the remarkable phenomenon of a retention of the same percentage elongation as is found with the unloaded stock no matter what the percentage loading. The asphaltic substance known as "mineral rubber" is likewise an excellent loading material. It somewhat retards the rate of cure of the polymer, but does not substantially reduce the tensile strength. The characteristics of polymer material loaded with the fine particle size whiting are shown in the following Table P.

TABLE P

| Per cent pigment in compound (based on rubberoid content) | 15' x 155° C. cure | | 30' x 155° C. cure | | 60' x 155° C. cure | |
|---|---|---|---|---|---|---|
| | Tensile | Elong. | Tensile | Elong. | Tensile | Elong. |
| | Lbs. per sq. in. | Per cent | Lbs. per sq. in. | Per cent | Lbs. per sq. in. | Per cent |
| 10 | 1,250 | 1,190 | 2,925 | 1,060 | 3,100 | 990 |
| 25 | 2,000 | 1,080 | 2,750 | 1,030 | 2,950 | 990 |
| 50 | 2,225 | 1,070 | 2,350 | 1,020 | 2,550 | 980 |
| 75 | 2,000 | 1,070 | 2,150 | 1,020 | 2,250 | 990 |
| 100 | 1,700 | 1,040 | 1,950 | 1,000 | 1,850 | 970 |

The effect of titanium dioxide is similarly shown in Table Q.

TABLE Q

| Per cent pigment in compound (based on rubberoid content) | 15' x 155° C. cure | | 30' x 155° C. cure | | 60' x 155° C. cure | |
|---|---|---|---|---|---|---|
| | Tensile | Elong. | Tensile | Elong. | Tensile | Elong. |
| | Lbs. per sq. in. | Per cent | Lbs. per sq. in. | Per cent | Lbs. per sq. in. | Per cent |
| 10 | 1,900 | 1,160 | 3,250 | 1,040 | | |
| 25 | 300 | 1,300 | 2,900 | 1,030 | 3,200 | 990 |
| 50 | 950 | 1,100 | 2,700 | 1,010 | 2,650 | 960 |
| 75 | 1,100 | 1,080 | 2,400 | 980 | 2,500 | 970 |
| 100 | 1,700 | 1,030 | 2,200 | 970 | 2,425 | 960 |

Likewise, the effect of Dixie clay is shown in Table R.

TABLE R

| Per cent pigment in compound (based on rubberoid content) | 15' x 155° C. cure | | 30' x 155° C. cure | | 60' x 155° C. cure | |
|---|---|---|---|---|---|---|
| | Tensile | Elong. | Tensile | Elong. | Tensile | Elong. |
| | Lbs. per sq. in. | Per cent | Lbs. per sq. in. | Per cent | Lbs. per sq. in. | Per cent |
| 10 | 2,300 | 1,080 | 2,400 | 1,020 | 3,200 | 1,000 |
| 25 | 1,600 | 990 | 2,400 | 930 | 2,850 | 930 |
| 50 | 1,500 | 900 | 1,900 | 880 | 2,450 | 880 |
| 75 | Blistered | | 1,400 | 810 | 1,500 | 770 |
| 100 | Blistered | | 1,550 | 790 | 1,750 | 730 |

The effect of mineral rubber is shown in Table S.

TABLE S

| Per cent pigment in compound (based on rubberoid content) | 15' x 155° C. cure | | 30' x 155° C. cure | | 60' x 155° C. cure | |
|---|---|---|---|---|---|---|
| | Tensile | Elong. | Tensile | Elong. | Tensile | Elong. |
| | Lbs. per sq. in. | Per cent | Lbs. per sq. in. | Per cent | Lbs. per sq. in. | Per cent |
| 10 | 2,500 | 1,100 | 3,100 | 1,050 | 2,600 | 930 |
| 25 | 1,500 | 1,170 | 2,350 | 1,110 | 2,625 | 1,070 |
| 50 | 825 | 1,260 | 1,400 | 1,110 | 1,625 | 1,030 |

And the effect of zinc oxide is shown in Table T.

TABLE T

| Per cent pigment in compound (based on rubberoid content) | 15' x 155° C. cure | | 30' x 155° C. cure | | 60' x 155° C. cure | |
|---|---|---|---|---|---|---|
| | Tensile | Elong. | Tensile | Elong. | Tensile | Elong. |
| | Lbs. per sq. in. | Per cent | Lbs. per sq. in. | Per cent | Lbs. per sq. in. | Per cent |
| 10 | 2,100 | 1,130 | 2,750 | 1,060 | 3,000 | 1,000 |
| 25 | 2,300 | 1,090 | 2,700 | 1,030 | 3,225 | 1,000 |
| 50 | 2,450 | 1,090 | 2,775 | 1,040 | 2,900 | 1,000 |
| 75 | 2,100 | 1,170 | 2,575 | 1,070 | 2,700 | 1,030 |
| 100 | 1,800 | 1,110 | 2,300 | 1,080 | 2,400 | 1,010 |

The polymeric material either in the uncured or cured condition has a wide range of uses.

The high water resistance, high abrasion resistance and relatively low dielectric constant of the material makes it highly desirable for the insulation of power transmission wires and cables. These same characteristics, together with the property of absorbing large quantities of sulfur without becoming hard and brittle, make it highly advantageous for insulating material generally. Sulfur as such is an excellent electrical insulator and it retains these properties when compounded into the polymeric material even to the extent of 100 parts or more of sulfur per 100 parts of polymer. This composition is soft and flexible in spite of the very high sulfur content and produces an exceedingly durable, high quality, insulating material. The sulfur content may be raised still higher to the point where the polymer serves as little more than a binder for the particles of sulfur and the product then becomes relatively stiff and strong, but not brittle, and not easily broken.

It is useful in combination with practically any of the natural and synthetic resins and gums with some of which it forms a true solution, with others of which it forms a colloidal solution, and with still others of which one or the other forms a disperse phase within a continuous phase. It is particularly useful with such resins as the polyindene-coumarones, the polyvinyl chlorides, polyvinyl acetylene, poly coumarones, polyvinyl acetate, poly acrylates, cellulose esters and ethers, chlorinated rubber, phenol aldehyde resins substantially any of the natural gums and resins, the natural and synthetic waxes, rosin and natural resins, poly-, styrenes, polyethylene and the amides, factice, the amino plastics, the polyaryl alkyd resins, rubber hydrochloride, ester gums, etc.

The material is effectively plasticized by combination with solid aromatic hydrocarbon compounds naphthalene, etc., especially for extrusion and calendering processes. The cured polymer is substantially improved in physical properties by the addition of from 1% to 55% of the resin obtainable from petroleum residues. Similarly, it is substantially improved for certain purposes by the addition of substantial quantities of the phenol formaldehyde condensation resins such as Bakelite, the formaldehyde aromatic hydrocarbon resins, the urea or thio urea resins, etc. The elongation and permanent set of the cured polymer is reduced by the addition of substantial proportions of cyclo rubber. Vinyl alcohol and vinyl chloride, either as such or in the polymeric form, are advantageously incorporated into the material either before or after curing for the production of desired modifications of the characteristics of the polymer such as softening. Similarly, aromatic vinyl compounds, when added to the polymer, improve the thermal plasticity and workability. The cold brittleness characteristic of various of the waxes, mineral waxes, petroleum waxes, and particularly the vegetable waxes, is greatly reduced by the inclusion in the wax of small portions of the polymer material. Such a composition is also much tougher than the wax alone. Similarly, polydihydronaphthalene is compatible with the polymer, and may be compounded therewith to produce a stiffer, less elastic resin.

While there are above described but a limited number of embodiments of the structure of the invention, it is possible to produce still other embodiments without departing from the inventive concept herein disclosed, and it is therefore desired that only such limitations be imposed upon the appended claims as are stated therein or required by the prior art.

The invention claimed is:

1. The process of preparing a solid plastic, hydrocarbon interpolymer comprising the step of reacting together a major proportion of an aliphatic isoolefin having 4 to 7, inclusive carbon atoms per molecule with a minor proportion of a conjugated aliphatic diolefin having 4 to 8, inclusive, carbon atoms per molecule at a temperature between $-50°$ C. and $-160°$ C. in the presence of a polymerization catalyst comprising aluminum chloride dissolved in an organic solvent characterized by less than 3 carbon atoms per molecule, a freezing point below $-50°$ C. and non reactivity with aluminum chloride.

2. The process of preparing a solid plastic, hydrocarbon interpolymer comprising the step of reacting together a major proportion of an aliphatic isoolefin having 4 to 7, inclusive carbon atoms per molecule with a minor proportion of a conjugated aliphatic diolefin having 4 to 8, inclusive, carbon atoms per molecule at a temperature between $-50°$ C. and $-160°$ C. in the presence of a polymerization catalyst comprising aluminum chloride dissolved in ethyl chloride.

3. The process of preparing a solid elastic, hydrocarbon interpolymer comprising the steps of reacting together a major proportion of an aliphatic isoolefin having 4 to 7, inclusive carbon atoms per molecule with a minor proportion of a conjugated aliphatic diolefin having 4 to 8, inclusive, carbon atoms per molecule at a temperature between $-50°$ C. and $-160°$ C. in the presence of a polymerization catalyst comprising aluminum chloride dissolved in a solvent characterized by less than 3 carbon atoms per molecule, a freezing point below $-50°$ C. and non reactivity with aluminum chloride and thereafter reacting the polymer with sulfur.

4. The process of preparing a solid elastic, hydrocarbon interpolymer comprising the steps of reacting together a major proportion of an aliphatic isoolefin having 4 to 7, inclusive carbon atoms per molecule with a minor proportion of a conjugated aliphatic diolefin having 4 to 8, inclusive, carbon atoms per molecule at a temperature between $-50°$ C. and $-160°$ C. in the presence of a polymerization catalyst comprising aluminum chloride dissolved in ethyl chloride and reacting the polymer with sulfur in the presence of a sulfurization aid.

5. The process of preparing a solid, plastic, hydrocarbon interpolymer which is reactive with sulfur to give an elastic product comprising the steps of reacting together a major proportion of an aliphatic isoolefin having 4 to 7, inclusive, carbon atoms per molecule, with a minor proportion of an aliphatic conjugated diolefin having 4 to 8, inclusive, carbon atoms per molecule, at a temperature between $0°$ C. and $-160°$ C. in the presence of a polymerization catalyst comprising a Friedel-Crafts catalyst dissolved in a solvent which forms no complex with the Friedel-Crafts catalyst and is liquid at the reaction temperature.

6. The process of preparing a solid, plastic, hydrocarbon interpolymer comprising the step of reacting together a low molecular weight aliphatic isoolefin having less than 8 carbon atoms per molecule with a low molecular weight aliphatic diolefin having 4 to 8, inclusive, carbon atoms per molecule in the presence of a Friedel-Crafts catalyst dissolved in a solvent which forms no complex with the Friedel-Crafts catalyst and is liquid at the reaction temperature, the reaction being conducted at a temperature below 0° C.

7. The process of preparing a solid, plastic, hydrocarbon interpolymer which is reactive with sulfur to give an elastic product comprising the step of reacting together a major proportion of isobutylene with a minor proportion of a low molecular weight, aliphatic, conjugated diolefin having less than 7 carbon atoms per molecule in the presence of a Friedel-Crafts catalyst dissolved in an organic solvent which forms no complex therewith and is liquid at the reaction temperature, the reaction being conducted at a temperature between 0° C. and —160° C.

8. The process of preparing a solid, plastic hydrocarbon interpolymer which is reactive with sulfur to yield an elastic product comprising the step of reacting together a major proportion of a low molecular weight aliphatic isoolefin having less than 8 carbon atoms per molecule with a low molecular weight aliphatic diolefin having the type formula

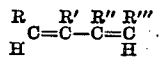

in which R, R', R", and R''' are substituents selected from the group consisting of hydrogen and alkyl groups, in the presence of a Friedel-Crafts catalyst dissolved in a solvent which forms no complex therewith and is liquid at the reaction temperature, the reaction being conducted at a temperature between 0° C. and —160° C.

9. The process of preparing a solid, plastic hydrocarbon interpolymer which is reactive with sulfur to yield an elastic product comprising the step of reacting together a major proportion of isobutylene with a minor proportion of butadiene in the presence of a Friedel-Crafts catalyst dissolved in a solvent which forms no complex therewith and is liquid at the reaction temperature, the reaction being conducted at a temperature between 0° C. and —160° C.

10. The process of preparing a solid, plastic hydrocarbon interpolymer which is reactive with sulfur to yield an elastic product comprising the step of reacting together a major proportion of isobutylene with a minor proportion of butadiene in the presence of aluminum chloride dissolved in methyl chloride, the reaction being conducted at a temperature between —50° C. and —160° C.

11. The process of preparing a solid, plastic hydrocarbon interpolymer comprising the step of reacting together a low molecular weight aliphatic isoolefin having less than 8 carbon atoms per molecule with a low molecular weight aliphatic diolefin having 4 to 8, inclusive, carbon atoms per molecule in the presence of aluminum chloride dissolved in an organic solvent which forms no complex with the aluminum chloride and is liquid at the reaction temperature, the reaction being conducted at a temperature between 0° C. and —160° C.

12. The process of preparing a solid, plastic hydrocarbon interpolymer which is reactive with sulfur to give an elastic product comprising the step of reacting together a major proportion of isobutylene with a minor proportion of a low molecular weight aliphatic conjugated diolefin having less than 7 carbon atoms per molecule in the presence of a Friedel-Crafts catalyst dissolved in a solvent which forms no complex therewith and is liquid at the reaction temperature, the reaction being conducted at a temperature between 0° C. and —160° C.

13. The process of preparing a solid, plastic, hydrocarbon interpolymer which is reactive with sulfur to give an elastic product comprising the step of reacting together a major proportion of isobutylene with a minor proportion of a low molecular weight aliphatic conjugated diolefin having less than 7 carbon atoms per molecule in the presence of aluminum chloride dissolved in an alkyl halide which forms no complex with the aluminum chloride and is liquid at the reaction temperature, the reaction being conducted at a temperature between 0° C. and —160° C.

14. The process of preparing a solid, plastic, hydrocarbon interpolymer comprising the step of reacting together isobutylene with a low molecular weight aliphatic conjugated diolefin having less than 7 carbon atoms per molecule in the presence of aluminum chloride dissolved in ethyl chloride, the reaction being conducted at a temperature between —50° C. and —160° C.

15. The process of preparing a solid, plastic, hydrocarbon interpolymer which is reactive with sulfur to give an elastic product comprising the step of reacting together a major proportion of isobutylene with a minor proportion of a low molecular weight aliphatic conjugated diolefin having less than 7 carbon atoms per molecule in the presence of aluminum chloride dissolved in methyl chloride, the reaction being conducted at a temperature between —50° C. and —160° C.

16. The process of preparing solid, plastic, hydrocarbon interpolymer which is reactive with sulfur to give an elastic product comprising the step of reacting together a major proportion of isobutylene with a minor proportion of a low molecular weight aliphatic conjugated diolefin having less than 7 carbon atoms per molecule in the presence of aluminum chloride dissolved in carbon disulfide, the reaction being conducted at a temperature between —50° C. and —160° C.

17. The process of preparing sulfurized, solid, elastic hydrocarbon interpolymer comprising the step of reacting together a major proportion of a low molecular weight aliphatic isoolefin having less than 8 carbon atoms with a minor proportion of a low molecular weight aliphatic diolefin having 4 to 8, inclusive, carbon atoms per molecule in the presence of a Friedel-Crafts catalyst dissolved in a solvent which forms no complex therewith and is liquid at the reaction temperature, the reaction being conducted at a temperature between 0° C. and —160° C. and thereafter heating the polymer with a sulfurizing agent.

18. The process of preparing sulfurized solid elastic hydrocarbon interpolymer comprising heating with a sulfurizing agent a synthetic solid plastic hydrocarbon interpolymer of a major proportion of an isoolefin having less than 8 carbon atoms per molecule with a minor proportion of a conjugated diolefin having 4 to 8 inclusive carbon atoms per molecule, the said plastic interpolymer being characterized by a low unsaturation below an iodine number of 50, a molecular weight above 15,000 and reactivity with sulfur to yield a product of increased elasticity.

19. The process of preparing a sulfurized, solid, elastic hydrocarbon interpolymer comprising the step of reacting together a major proportion of a low molecular weight aliphatic isoolefin having less than 8 carbon atoms per molecule with a minor proportion of a low molecular weight conjugated aliphatic diolefin having 4 to 8, inclusive, carbon atoms per molecule in the presence of a Friedel-Crafts catalyst dissolved in a solvent which forms no complex therewith and is liquid at the reaction temperature, the reaction being conducted at a temperature between 0° C. and −160° C. and thereafter heating the polymer with sulfur and a sulfurization aid.

20. The process of preparing a sulfurized, solid, elastic hydrocarbon interpolymer comprising the step of reacting together a major proportion of isobutylene with a minor proportion of butadiene in the presence of a Friedel-Crafts catalyst dissolved in an organic solvent which forms no complex therewith and is liquid at the reaction temperature, the reaction being conducted at a temperature between −50° C. and −160° C. and thereafter heating the polymer with sulfur and a sulfurization aid.

21. The process of preparing a sulfurized, elastic, hydrocarbon interpolymer comprising the step of reacting together a major proportion of isobutylene with a minor proportion of a low molecular weight, aliphatic, conjugated diolefin having 4 to 8, inclusive, carbon atoms per molecule in the presence of an active halide Friedel-Crafts catalyst dissolved in a solvent which forms no complex therewith and is liquid at the reaction temperature, the reaction being conducted at a temperature between −50° C. and −160° C., and thereafter heating the polymer with sulfur and a sulfurization aid having a type formula

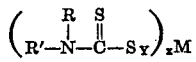

in which R and R' are alkyl groups, M is a metal, and X and Y are integers.

22. The process of preparing a sulfurized, elastic, hydrocarbon interpolymer comprising the step of reacting together a major proportion of isobutylene with a minor proportion of a low molecular weight, aliphatic, conjugated diolefin having 4 to 8, inclusive, carbon atoms per molecule in the presence of an active halide Friedel-Crafts catalyst dissolved in a solvent which forms no complex therewith and is liquid at the reaction temperature, the reaction being conducted at a temperature between −50° C. and −160° C., and thereafter heating the polymer with sulfur and a sulfurization aid having a type formula

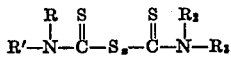

in which R, R', R2, and R3, are alkyl groups and X is an integer.

23. The process of preparing a sulfurized, elastic, hydrocarbon interpolymer comprising the step of reacting together a major proportion of isobutylene with a minor proportion of a low molecular weight, aliphatic, conjugated diolefin having less than 7 carbon atoms in the presence of a Friedel-Crafts catalyst dissolved in a solvent which forms no complex therewith and is liquid at the reaction temperature, the reaction being conducted at a temperature between −50° C. and −160° C., and thereafter heating the polymer with sulfur and a sulfurization aid comprising tetramethyl thiuram disulfide.

24. The process of preparing sulfurized solid elastic hydrocarbon interpolymers comprising heating with sulfur and tetramethyl thiuram disulfide a synthetic solid plastic hydrocarbon interpolymer of a major proportion of isobutylene with a minor proportion of butadiene, the said plastic polymer being characterized by low unsaturation below an iodine number of 50, a molecular weight above 15,000, and reactivity with sulfur to yield an elastic product.

25. A synthetic, solid, plastic, hydrocarbon interpolymer of a major proportion of an isoolefin having less than 8 carbon atoms per molecule with a minor proportion of a conjugated aliphatic diolefin having 4 to 8, inclusive, carbon atoms per molecule the said polymer being characterized by a low unsaturation below an iodine number of 50, a molecular weight above 15,000 and reactivity with sulfur to yield a product of increased elasticity.

26. A synthetic solid, plastic, hydrocarbon interpolymer of a major proportion of isobutylene with a minor proportion of a conjugated diolefin having 4 to 8, inclusive, carbon atoms per molecule, the polymer being characterized by a low unsaturation below an iodine number of 50, a molecular weight above 15,000, and reactivity with sulfur to yield an elastic product.

27. A synthetic, solid, plastic, hydrocarbon interpolymer of a major proportion of isobutylene with a minor proportion of butadiene, the polymer being characterized by a low unsaturation below an iodine number of 50, a molecular weight above 15,000, and reactivity with sulfur to yield an elastic product.

28. A sulfurized, synthetic, solid, elastic hydrocarbon interpolymer of a major proportion of an isoolefin having less than 8 carbon atoms per molecule with a minor proportion of a conjugated aliphatic diolefin having 4 to 8, inclusive, carbon atoms per molecule said sulfurized elastic polymer having an elastic limit and a tensile strength at break above 1,000 lbs. per square inch.

29. A sulfurized, synthetic, solid, elastic hydrocarbon interpolymer of a major proportion of an isoolefin having less than 8 carbon atoms per molecule with a minor proportion of a diolefin having 4 to 8, inclusive, carbon atoms per molecule said sulfurized elastic polymer having an elastic limit and a tensile strength at break above 1,000 lbs. per square inch and an elongation at break ranging up to 1100%.

30. A synthetic, solid, elastic sulfurized hydrocarbon interpolymer of a major proportion of an isoolefin having less than 8 carbon atoms per molecule with a minor proportion of a conjugated aliphatic diolefin having 4 to 8, inclusive, carbon atoms per molecule said sulfurized elastic polymer having an elastic limit, a tensile strength above 1,000 lbs. per square inch, and an elongation at break ranging up to 1100%.

31. A synthetic, solid, elastic sulfurized hydrocarbon interpolymer of a major proportion of isobutylene with a minor proportion of butadiene said sulfurized elastic polymer having an elastic limit, a tensile strength above 1,000 lbs. per square inch, and an elongation at break ranging up to 1100%.

32. A synthetic, solid, elastic sulfurized hydrocarbon interpolymer characterized by an elastic limit, an elongation ranging from 500% to 1100% and a tensile strength above 1000 lbs. per square inch; the said sulfurized interpolymer being chemically saturated and comprising in each molecule thereof a major proportion of isobutylene and a minor proportion of butadiene and sulfur.

33. A synthetic, solid, elastic sulfurized hydrocarbon interpolymer characterized by an elastic limit, an elongation ranging from 500% to 1100% and a tensile strength above 1000 lbs. per square inch; the said sulfurized interpolymer being chemically saturated and comprising in each molecule thereof a major proportion of isobutylene and a minor proportion of butadiene and sulfur together with a sulfurization aid.

34. The process of preparing sulfurized, solid, elastic hydrocarbon interpolymer comprising the step of reacting together a major proportion of a low molecular weight aliphatic isoolefin having less than 8 carbon atoms with a minor proportion of a low molecular weight conjugated aliphatic diolefin having 4 to 8, inclusive, carbon atoms per molecule in the presence of a Friedel-Crafts catalyst dissolved in a solvent which forms no complex therewith and is liquid at the reaction temperature, the reaction being conducted at a temperature between 0° C. and −160° C. and thereafter heating the polymer with a dithiocarbamate sulfurizing agent.

35. The process of preparing sulfurized, solid, elastic hydrocarbon interpolymer comprising the step of reacting together a major proportion of a low molecular weight aliphatic isoolefin having less than 8 carbon atoms with a minor proportion of a low molecular weight conjugated aliphatic diolefin having 4 to 8, inclusive, carbon atoms per molecule in the presence of a Friedel-Crafts catalyst dissolved in a solvent which forms no complex therewith and is liquid at the reaction temperature, the reaction being conducted at a temperature between 0° C. and −160° C. and thereafter heating the polymer with a zinc dimethyl dithiocarbamate sulfurizing agent.

36. A cured, synthetic, solid, elastic hydrocarbon interpolymer of a major proportion of an isoolefin having less than 8 carbon atoms per molecule with a minor proportion of a diolefin having 4 to 8, inclusive, carbon atoms per molecule, said cured elastic polymer being characterized by substantially complete chemical saturation, a molecular weight above 15,000, an elastic limit and a tensile strength at break above 1,000 lbs. per square inch.

ROBERT M. THOMAS.
WILLIAM J. SPARKS.